(12) United States Patent
Wada et al.

(10) Patent No.: US 7,413,786 B2
(45) Date of Patent: Aug. 19, 2008

(54) ADHESIVE ROLL CLEANER

(75) Inventors: Minoru Wada, Tochigi (JP); Yuji Watahiki, Tochigi (JP); Akihito Shizuno, Tochigi (JP)

(73) Assignee: Kao Corporation, Tokyo (JP)

( * ) Notice: Subject to any disclaimer, the term of this patent is extended or adjusted under 35 U.S.C. 154(b) by 86 days.

(21) Appl. No.: 10/529,903

(22) PCT Filed: Dec. 2, 2003

(86) PCT No.: PCT/JP03/15432

§ 371 (c)(1),
(2), (4) Date: Apr. 1, 2005

(87) PCT Pub. No.: WO2004/060134

PCT Pub. Date: Jul. 22, 2004

(65) Prior Publication Data

US 2006/0040080 A1 Feb. 23, 2006

(30) Foreign Application Priority Data

Dec. 26, 2002 (JP) ............................. 2002-377610

(51) Int. Cl.
- *B32B 7/12* (2006.01)
- *B32B 3/00* (2006.01)
- *B05C 1/00* (2006.01)
- *A01B 29/00* (2006.01)
- *A47L 25/00* (2006.01)

(52) U.S. Cl. ............... 428/40.1; 428/42.2; 428/343; 428/906; 15/104.001; 15/104.002; 15/230.11; 15/230.12; 15/230.13; 492/30; 492/35; 492/44

(58) Field of Classification Search ............... 428/40.1, 428/42.2, 343, 906; 492/30, 35, 44; 15/104.002, 15/104.011, 104.001, 230.11–230.13
See application file for complete search history.

(56) References Cited

U.S. PATENT DOCUMENTS

| | | | |
|---|---|---|---|
| 2,807,039 A | | 9/1957 | Butler |
| 3,342,325 A | * | 9/1967 | Dreher ........................ 206/400 |
| 3,343,194 A | * | 9/1967 | Ramelson ............... 15/104.002 |
| 3,417,418 A | * | 12/1968 | Pierre-Jean ............ 15/104.002 |
| 5,548,861 A | * | 8/1996 | Hukuba ................. 15/104.002 |
| 5,763,038 A | * | 6/1998 | Wood ........................... 428/43 |
| 2003/0088928 A1 | * | 5/2003 | Shizuno et al. ......... 15/104.002 |

FOREIGN PATENT DOCUMENTS

| | | |
|---|---|---|
| DE | 94 02 146 | 3/1994 |
| DE | 44 04 043 | 8/1995 |
| JP | 11-216096 | 8/1999 |
| WO | 02 069780 | 9/2002 |

* cited by examiner

*Primary Examiner*—Patricia L Nordmeyer
(74) *Attorney, Agent, or Firm*—Oblon, Spivak, McClelland, Maier & Neustadt, P.C.

(57) ABSTRACT

An adhesive roll cleaner 1 comprises a core tube and a plurality of adhesive tapes 3 having an adhesive portion A on one side thereof helically wound around the core tube in a layered configuration with the adhesive portion A out. Each of the adhesive tapes 3 is wound with a gap G of prescribed width between a side edge S1 and an adjacent side edge S2, and the width of the adhesive tapes 3 increases toward outside.

10 Claims, 4 Drawing Sheets

ADHESIVE ROLL CLEANER

FIELD OF THE INVENTION

The present invention relates to a roll type adhesive cleaner used to clean carpeted or non-carpeted floors.

BACKGROUND OF THE INVENTION

An adhesive roll cleaner having single-sided adhesive tapes helically wound around a core tube in an edge-to-edge configuration (with neither gap nor overlap) with its adhesive surface outside is known (see JP-A-11-216096). Since the adhesive tape is butt wrapped, the adjacent turns are even so that it is not easy to pick up the end of the tape to peel off. Besides, it is difficult to butt wrap the adhesive tape in a stable manner because only a little meandering of the adhesive tape which occurs by some cause during winding the adhesive tape so as to make it an edge-to-edge configuration would result in a gap or an overlap between adjacent edges.

An adhesive roll cleaner having adhesive tapes helically wound with an overlap between adjacent turns instead of being butt wrapped is also known (see WO02/069780A1). In order to prevent double peeling (a phenomenon that peeling of a top adhesive tape is accompanied with peeling of an underlying adhesive tape), the adhesive side of the adhesive tape used in this roll cleaner has its one side portion remaining non-coated with an adhesive over the whole length of the tape. The roll cleaner of this type is free from the problems associated with the above-described type. However, it is not easy to form the non-coated side portion on only one longitudinal side without fail, which leads to an increased cost of production. Production cost could be reduced by forming the non-coated side portion on both longitudinal sides of the adhesive tape. In that case there would be no adhesive in the overlaps, which can cause the adhesive tape to lift during wrapping around a core or storage of the roll cleaner or to be peeled unintentionally during use of the roll cleaner.

SUMMARY OF THE INVENTION

The present invention provides an adhesive roll cleaner having a core tube and a plurality of adhesive tapes. Each of the adhesive tapes has an adhesive applied to one side thereof to form an adhesive portion. Each of the adhesive tapes is helically wound around the core tube in a layered configuration with the adhesive portion out. Each of the adhesive tapes is wound with a gap of prescribed width between every adjacent turns. The adhesive tape which is located at the upper layer has a larger width than that of the adhesive tape which is located at the lower layer.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings and in which:

DETAILED DESCRIPTION OF THE INVENTION

The present invention relates to an adhesive roll cleaner having helically wound adhesive tapes. According to the present invention, the adhesive tapes can be prevented from lifting during tape winding or storage of the roll or from being peeled unintentionally during use.

Figure 1:
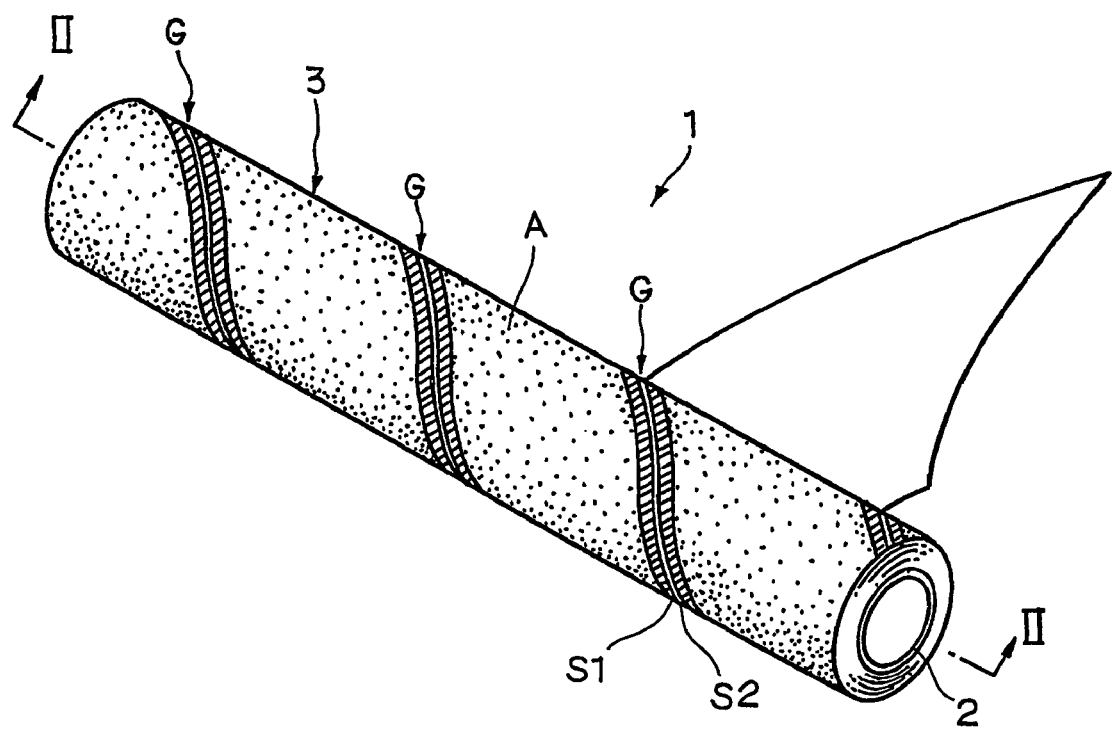
FIG. 1 is a perspective view of an embodiment of the adhesive roll cleaner according to the present invention.
Figure 2:
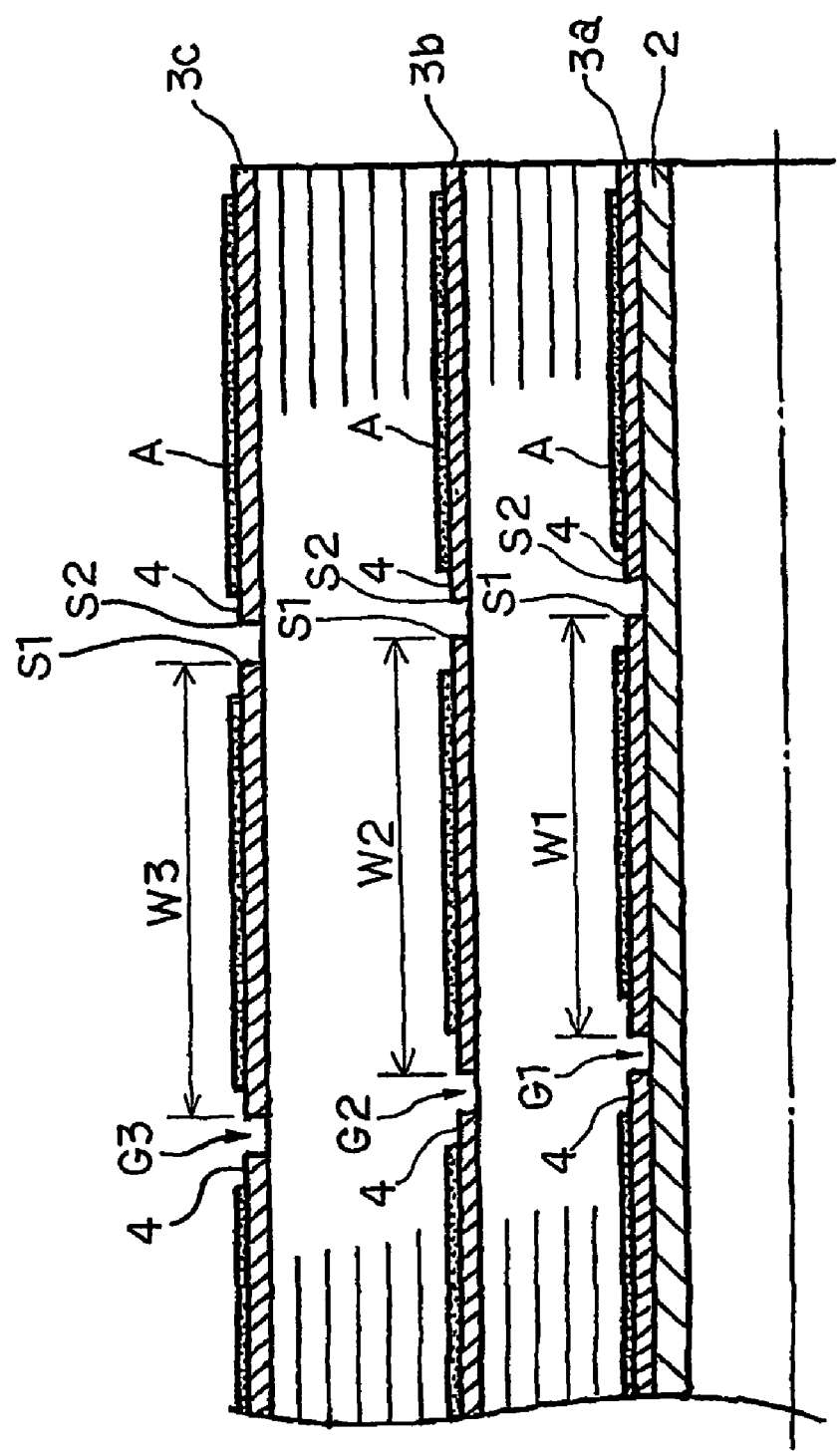
FIG. 2 is a cross-sectional view on arrow II in FIG. 1.

FIG. 1 is a perspective of an embodiment of the adhesive roll cleaner according to the present invention. FIG. 2 is a cross sectional view on arrow II in FIG. 1. The adhesive roll cleaner 1 shown in FIG. 1 has a cylindrical core tube 2 and adhesive tapes 3. Each of the adhesive tapes is helically wound around the core tube 2. The adhesive tape 3 is made of a base sheet having an adhesive applied on one side thereof to provide an adhesive portion A. That is, the adhesive tape 3 is a single-sided adhesive tape. The other side of the adhesive tape 3 has a release finish against the tack. The adhesive tape 3 is a strip having a prescribed width and wound around the core tube 2 with its adhesive side (adhesive portion A) out. While depending on a particular use of the adhesive roll cleaner 1, the width of the adhesive tape 3 preferably ranges from 40 to 75 mm, more preferably 45 to 65 mm, taking into consideration ease of peeling when soiled and good productivity of the adhesive roll cleaner 1.

The adhesive roll cleaner 1 is made up of n separate adhesive tapes 3 individually wrapped to form n layers. The adhesive tape in direct contact with the core tube 2 (the undermost adhesive tape) is adhered to the core tube 2 with a both-sided adhesive tape so that the n adhesive tapes 3 may be made effective use of to the last. In the adhesive roll cleaner 1, taking convenience of use into consideration, the core tube 2 preferably has an inner diameter of 22 to 50 mm and a thickness of 1 to 2 mm. The adhesive tapes 3 are preferably wound around such a core tube to make a roll whose outer diameter is in a range of from 22 to 40 mm, more preferably from 23 to 38 mm, throughout the use of the adhesive roll cleaner 1. In other words, the roll cleaner 1 is preferably designed to keep its outer diameter within that range from the start of using the roll cleaner 1 till using up the adhesive tapes 3. From the standpoint of convenience of use, the width of the adhesive roll cleaner 1 is preferably 180 to 300 mm, still preferably 190 to 250 mm.

Each adhesive tape 3 is helically wound around the core tube 2 with a prescribed gap G between a side edge S1 of a turn and a side edge S2 of an adjacent turn. The gap G provides a level difference on the side edge of the adhesive tape 3, which makes it easy for a user to pick up the tip T of a soiled adhesive tape 3 to peel off the adhesive tape 3. In an adhesive roll cleaner of the type having adhesive tapes helically wound in an edge-to-edge configuration (see JP-A-11-216096), it is not easy for a user to pick up the tip of each adhesive tape because of the absence of such a level difference.

The adhesive tapes 3 are wound in such a manner that the positions of the gaps G are different between layers adjacent in the thickness direction as representatively shown by reference characters G1, G2, and G3 in FIG. 2. With this configuration, when a user peels off a soiled outermost adhesive tape 3 to expose a fresh adhesive surface, the underlying adhesive tape is effectively prevented from accompanying the tape being peeled (double peeling). To prevent double peeling more effectively, it is preferred that the tip of an adhesive tape 3 be 30 to 60 mm, more preferably 40 to 60 mm, distant from the tip of the underlying adhesive tape as measured in the circumferential direction of the roll cleaner 1.

If the gaps G are too wide, dust would be adhered to the underlying adhesive tape exposed in the gaps G. In that case, after a soiled outermost adhesive tape is peeled off, the exposed underlying adhesive tape has already dust adhered thereto in an outstanding helical pattern. As a result of experimentation, it was confirmed that such a helical pattern of adhered dust is almost indistinctive as far as the gap width is about 0.1 to 4.0 mm, more preferably about 0.1 to 2.5 mm. Accordingly, it is preferred that the width of the gaps G be within this range.

As a result of further investigation, the present inventors have revealed that, with the width of the adhesive tapes being equal, the nearer to the outermost side the adhesive sheet positions, the wider the gap G becomes. This results in the following disadvantage. Even where the winding conditions, such as the winding angle of adhesive tapes with the axis of the core tube, are controlled so that the gap width of the first tape to be wound may fall within the above range, the n'th adhesive tape can form a gap width exceeding the upper limit of the range. Such being the case, the helical pattern of adhered dust will be noticeable, which means not only reduced capability of catching dust but reduced commercial value. The inventors have studied to eliminate the problem and found as a result that the width of gaps G can be maintained within the specified range by increasing the width of the adhesive tapes toward the outside either continuously or stepwise.

More specifically, in the present embodiment shown in FIG. 2, adhesive tapes 3$a$, 3$b$, and 3$c$ having different widths are used in such a manner that the width of the adhesive tapes stepwise increases toward outside. That is, the adhesive tape 3$a$ that is the lowest (innermost) has the smallest width W1, and the adhesive tape 3$c$ that is the uppermost (outermost) has the largest width W3. The width W2 of the adhesive tape 3$b$ which is positioned in the middle of the adhesive tapes 3$a$ and 3$c$ is the middle between W1 and W3. In short, W1<W2<W3. Taking an adhesive roll cleaner having 20 adhesive tapes wound to form 20 layers for instance, the innermost six layers (1st to 6th layers from the core tube) can be made of the adhesive tapes 3$a$ with the width W1, the next six layers (7th to 12th layers) can be made of the adhesive tapes 3$b$ with the width W2, and the outermost eight layers (13th to 20th layers) can be made of the adhesive tapes 3$c$ with the width W3. The widths of the adhesive tapes 3$a$, 3$b$, and 3$c$, respectively, are such that would be experientially decided by those skilled in the art according to the winding angle, the number of layers, and the like. As will be apparent from Examples described later, the widths of the gaps G1, G2, and G3 formed by the adhesive tapes 3$a$, 3$b$, and 3$c$, respectively, are sometimes equal and sometimes not. In either case, all the gap widths G1, G2 and G3 fall within the recited range. The winding angle increases in the order of 3$a$, 3$b$, and 3$c$, not intentionally but by necessity with an increasing winding diameter of the adhesive tapes.

Figure 3:
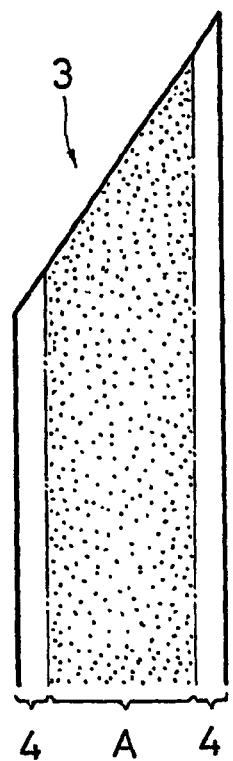
FIG. 3 is a plan view of an adhesive tape used in the adhesive roll cleaner of FIG. 1 in an unwound state.

To prevent double-peeling still more effectively, as shown in FIG. 3, each of the adhesive tapes 3 used in the present embodiment has non-adhesive portions 4, 4 with no adhesive applied on both longitudinal sides of the adhesive portion A. The non-adhesive portions 4 are continuously provided in the longitudinal direction of the adhesive tape 3. The width of the non-adhesive portion is preferably 2 to 15 mm, still preferably 3 to 10 mm, for preventing double peeling while securing a sufficient effective cleaning area and also for assuring easy peelability even with a hair wound around particularly effective where an about 10 cm long hair is clinging around). In case where an adhesive tape having such a non-adhesive portion on both longitudinal sides thereof is applied to the lap winding as proposed in WO 02/069780A1, the adhesive tape can lift during tape winding or roll cleaner storage or can peel spontaneously during use. According to the present embodiment, such inconveniences due to the non-adhesive portion on each side do not occur as long as the adhesive tapes are wrapped with gaps between every adjacent turns.

Figure 4A:
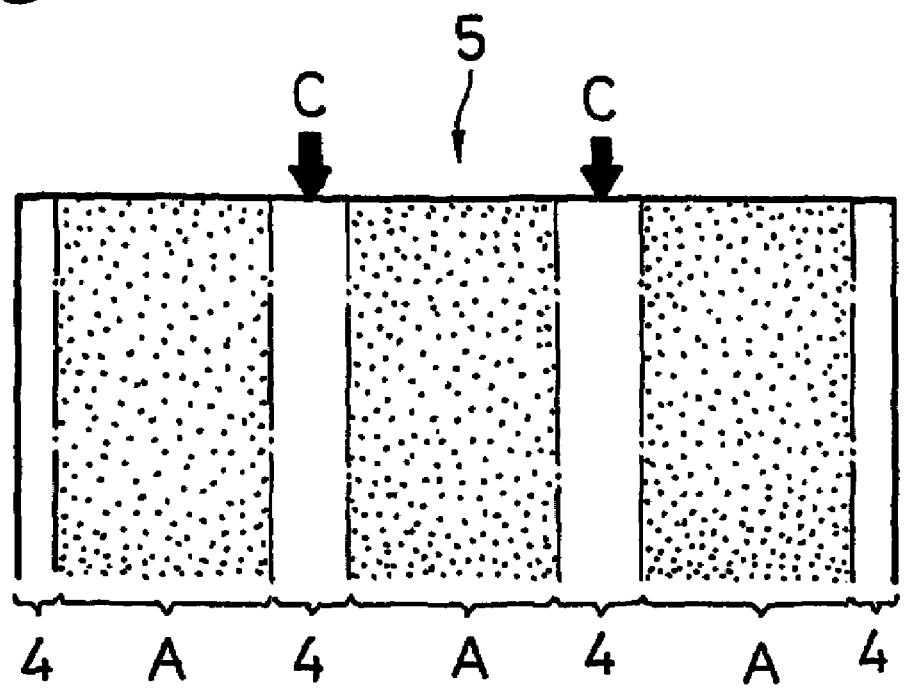
FIGS. 4A and 4B are illustrations showing a method of producing the adhesive tape of FIG. 3.
Figure 4B:
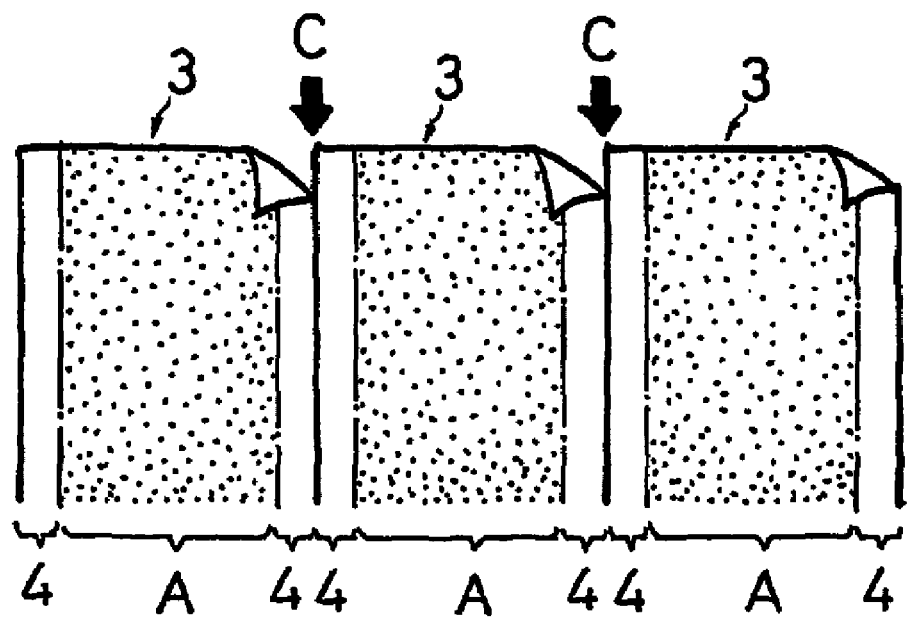

A single-sided adhesive tape having non-adhesive portions 4, 4 on their sides can be prepared easily by the method shown in FIGS. 4A and 4B. As shown in FIG. 4A, a continuous sheet 5 whose width is a several multiple of the width of an adhesive tape is fed from the stock roll (not shown). An adhesive is applied by gravure printing or a like technique on one side of the continuous sheet 5 in broad stripes at a given interval between the longitudinal sides to form adhesive portions A. As shown in FIG. 4B, the continuous sheet 5 is then slit into strips of prescribed width with a cutting means (not shown), such as a slitter, to obtain adhesive pates 3. Each cutting position C is in the non-adhesive portion between the adhesive portions A and A. There are thus obtained single-sided adhesive tapes having a non-adhesive portion 4 on each side thereof. According to this method, even if the cutting positions C are shifted slightly from the design by some cause, the non-adhesive portion 4 can be formed on both sides without fail. Therefore, the cutting operation achieves a good yield without requiring so high accuracy, which leads to reduction of production cost for the adhesive tapes 3. In contrast, in the case of WO 02/069780A1 using an adhesive tape having a non-adhesive portion on one longitudinal side thereof, the cutting operation needs high positional accuracy to secure a high yield because a shift of the cutting position C easily results in formation of non-adhesive portions on both longitudinal sides of the tape.

Figure 5:
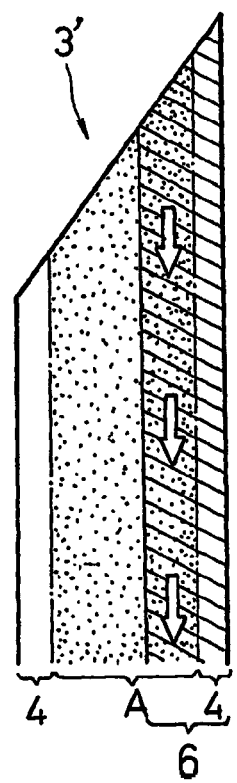
FIG. 5 is a plan view of another adhesive tape (corresponding to FIG. 3).

The adhesive tape may have a mark indicative of the peel position on one of the longitudinal side areas. For example, the adhesive tape 3' shown in FIG. 5 has a white background, and one of the longitudinal side portions is colored over the whole length to make a mark 6. Arrows indicating the peel direction of the adhesive tape 3' are printed on the colored area forming the mark 6. Letters indicating the peel direction can be displayed in place of or in addition to the arrows. The adhesive tape 3' has non-adhesive portions 4, 4 on each longitudinal side thereof similarly to the adhesive tape 3 shown in FIG. 3. On helically winding the adhesive tapes 3', the colored area forming the mark 6 overlaps on the white background of the underlying adhesive tape 3'. The difference between the two colors facilitates finding the peel starting end with the naked eye. Even when the adhesive tape 3' tears during the peeling operation, the torn end can be found with ease. The "mark" as referred to herein is a means for helping a user recognize the peel starting end. In addition to the coloring as in the above-described embodiment, the mark includes printed display of figures, signals, letters, etc., stuck stickers, punched holes, and unevenness formed by embossing. While, in the example shown in FIG. 5, the mark 6 is wider than the non-adhesive portion 4 (part of the mark 6 forms the non-adhesive portion 4), the width relationship between the mark 6 and the non-adhesive portion 4 is not limited. The non-adhesive portion 4 may be wider than the mark 6.

In the roll cleaner 1 of this embodiment, because a soiled adhesive tape 3 can be removed easily by helical unwinding and thus the unwinding speed can be rapid, there is high probability of the adhesive tape 3 being torn by a long hair clinging around the adhesive portion A. Tear of the adhesive tape 3 by a clinging hair may occur more frequently on a compact roll cleaner with a smaller winding diameter around which a hair makes more turns. In this connection, it is preferred for the adhesive tape 3 to have a tear strength of 500 mN or higher as measured with an Elmendorf tear tester in accordance with JIS P8116. With this tear strength, the adhesive tape is effectively prevented from being torn when soiled and peeled off even with a long hair clinging therearound in the circumferential direction of the adhesive roll cleaner 1, and it is easy to expose a new adhesive surface. An Elmendorf tear strength of 800 mN or higher, especially 1100 mN or higher, is more effective to prevent tear of the adhesive tape 3 due to a clinging hair. The upper limit of the tear strength is not particularly limited. The higher the tear strength, the more preventive for the adhesive tape 3 from being torn due to a clinging hair. From the economical consideration, however, a preferred upper limit of the tear strength is about 100 N.

For effective prevention of the adhesive tape 3 from being torn due to a clinging hair, it is preferred for the adhesive tape 3 to have the recited tear strength in the direction perpendicular to the longitudinal direction of the adhesive tape, i.e., the width direction of the adhesive tape 3. The longitudinal direction of the adhesive tape 3 as referred to in the present invention is the direction along the winding direction of the adhesive tape 3.

The recited tear strength can be secured by, for example, appropriately selecting the materials and the basis weight or coating weight of the base sheet and the adhesive constituting the adhesive tape 3. Materials of the base sheet include paper, plastic films, nonwoven fabric and like sheeting. Paper is preferred of them from the viewpoint of workability in applying an adhesive and helically wrapping the adhesive tapes 3 and the production cost. In order for the adhesive tape 3 having a paper base sheet to have the specific tear strength, the paper base sheet preferably has an Elmendorf tear strength of 350 mN or higher, more preferably 500 mN or higher, especially 900 mN or higher, measured in accordance with JIS P8116. There is not a particular upper limit of the tear strength of the base sheet. It is preferred for effectively preventing tear of the adhesive tape 3 due to a clinging hair that the base sheet exhibits the above-recited tear strength particularly in the direction perpendicular to the longitudinal direction of the base sheet, i.e., the width direction of the base sheet.

The Elmendorf tear strength of the base sheet and the adhesive tape are measured as follows.

(1) Method of Measuring Elmendorf Tear Strength of Base Sheet (a) Preparation of Specimen and Method of Measurement The procedure of JIS P8116 is followed. In this particular measurement, the tear strength of a base sheet in the width direction (CD) is measured. A plurality of 63 mm wide and 75 mm long specimens were cut out of a sample sheet with the width and the length of the specimen agreeing with the CD and the MD of the sheet, respectively. The specimens are stacked, with the release-finished side and the non-finished side facing each other, so as to give a measurement within the effective measurement range, which is between scale readings 0 gf and 100 gf, desirably 25 gf and 100 gf, on an Elmendorf tear tester. The stack of the specimens is secured between two jaws of an Elmendorf tear tester with the width direction (CD) of the specimens vertical and the longitudinal direction (MD) horizontal. A 20 mm long initial tear is vertically (in the CD) made at the middle of the MD from the lower edge of the stack with the cutter attached to the tester. The tester is operated according to JIS P8116. On confirming complete vertical tear propagation in the CD, the load (gf) required for tearing is read. The measurement was quadruplicated for the same sample to ensure reproducibility.

(b) Data Analysis

The resulting data are converted to an Elmendorf tear strength F of a stack of 16 specimens as specified in JIS P8116 according to the following formula:

$$\text{Tear strength } F\ (mN) = W\ (gf)/n \times 16 \times g\ (m/s^2)$$

where $W$ (gf) is the reading of an Elmendorf tear tester; $n$ is the number of specimens stacked; and $g$ is an acceleration of gravity ($=9.8$ (m/s$^2$)).

An average of the quadruplicate measurements is taken as the tear strength of the sample. Since the tear strength is a 16-specimens-equivalent value, it is believed that a difference of the number of stacked specimens for each sample has no influence on the results.

JIS P8116 specifies a 63 mm wide specimen in the measurement of tear strength. In case the width of an actual specimen is less than 63 mm, the data obtained are normalized to a 63 mm width. More specifically, JIS P8116 specifies that a 20 mm long initial tear be made in a 63 mm wide specimen so that the tear length may be 43 mm. If the width of an actual specimen is 50 mm for example, the actual tear length is (50-20) mm, i.e., 30 mm. Then, the tear strength as defined in JIS P8116 is obtained by multiplying the measured tear strength by 43/30.

(2) Method of Measuring Elmendorf Tear Strength of Adhesive Tape

The tear strength of an adhesive tape is measured with an Elmendorf tear tester in accordance with JIS 8116 (corresponding to ISO 1974) similarly to the base sheet. The number of specimens to be stacked and the manner of stacking the specimens are the same as for the base sheet. In cutting out specimens, care should be taken so that at least the 43 mm width of the total 63 mm width (CD) other than the 20 mm width where an initial tear is made may be coated with the adhesive. Because of the adhesive applied, the specimens as they are will stick to each other when stacked with the adhesive side and the releasable side facing each other. Because JIS P8116 specifies that the stacked specimens must not stick together, the specimens need pretreatment for eliminating the tackiness of the adhesive. This can be done by uniformly applying silicone powder (KMP590, Lot 712180 from Shin-Etsu Chemical Co., Ltd.) to the adhesive surface with a 30 mm wide brush. Surface unevenness due to applied silicone powder is suppressed to some extent by use of a brush. The amount of silicone powder to be applied is such that the adhesive-coated side of the adhesive tape gets tack-free as confirmed by finger touch. Any other commercially available powder can also be used as long as the tack of the adhesive side is eliminated. Such a powder that results in increased surface unevenness when applied with a finger should be avoided, though.

The tear strength of paper can be heightened by, for example, (1) increasing the total number of fibers participating in breakage of the sheet or (2) selecting the kind of the pulp (e.g., length or thickness of pulp fibers). In the method (1), the total number of fibers participating in breakage of the sheet is decided by the basis weight of paper and flexibility of the sheet. Paper with a larger basis weight or paper with higher flexibility has a greater total number of fibers participating in the sheet breakage and exhibits a higher tear strength. Methods for increasing flexibility of paper include Culpak processing and creping. In the method (2), paper made of pulp fibers having a longer fiber length, a thicker diameter or a considerably thicker fiber wall exhibits higher tear strength. The work of tearing paper involves the work of drawing fibers from paper and the work of breaking the fibers. The work necessary to draw the fibers is far greater than the work necessary to break the fibers. Accordingly, soft wood pulp having a long fiber length is preferred. Of soft wood pulp kinds, those with a longer fiber length are more effective to increase the tear strength. Tear strength of paper can also be improved by making paper from wood pulp mixed with other fibers such as glass fiber or by adding an elastic polymer such as synthetic rubber. However, use of pulp fiber having a long fiber length or an increase of the basis weight results in increased paper stiffness, and it would follow that the resulting adhesive tape is difficult to wind helically around the core tube 2. From these considerations, it is preferred that paper to be used as a base sheet be soft paper having flexibility particularly in the winding direction, i.e., the longitudinal direction of the adhesive tape. Such paper includes the above-described Culpak-processed extensible paper. Paper used as a base sheet preferably has a basis weight of 40 to 200 g/m$^2$, more preferably 50 to 100 g/m$^2$.

The present invention is not limited to the above-described embodiments. For example, the non-adhesive portions 4 may be either continuous as in the illustrated embodiments or discontinuous. The mark 6 may also be either continuous or discontinuous.

In the above-described embodiment, the width of the adhesive tapes 3 in each layer stepwise increases with some layers in groups. Alternatively, the width may increase gradually from the innermost layer toward the outermost layers.

The present invention will now be illustrated in greater detail with reference to Examples. It should be understood that the present invention is not construed as being limited thereto.

EXAMPLE 1

Bleached kraft extensible paper (purchased from Oji Paper Co., Ltd.; basis weight: 75 g/m$^2$; Elmendorf tear strength in the direction perpendicular to the longitudinal direction: 1362 mN) was laminated with polyethylene (15 μm), and a silicone release agent was applied to the polyethylene side to prepare a base sheet having a release-finished side. A styrene-isoprene-styrene block copolymer (SIS) hot-melt adhesive was applied to the non-finished side of the base sheet to a spread of 36 g/m$^2$ in a prescribed pattern to prepare single-sided adhesive tapes having an adhesive portion and a non-adhesive portion on both sides of the adhesive portion as shown in FIG. 3. The resulting adhesive tape had an Elmendorf tear strength of 1385 mN in the direction perpendicular to the longitudinal direction as measured on specimens cut out of the adhesive portion. Twenty adhesive tapes thus prepared were helically wound around a paper core tube having an inner diameter of 1 inch (25.4 mm) and a thickness of 1.2 mm with the adhesive side out in such a manner that a gap (G) was left between adjacent turns. The resulting roll, the outer diameter of which reached 35 mm, was cut to lengths of 195 mm to obtain adhesive roll cleaners shown in FIG. 2. The initial winding angle of the adhesive tape was set at 52.9°. The widths of the 20 adhesive tapes were varied as shown in Table 1 below. The width of the gaps G of each layer making up the roll was measured. The results obtained are shown in Table 1.

COMPARATIVE EXAMPLE 1

An adhesive roll cleaner was obtained in the same manner as in Example 1, except that all the 20 adhesive tapes had a width of 54.0 mm. The width of the gaps G of each layer was measured. The results obtained are shown in Table 1.

TABLE 1

| Adhesive Tapes | Example 1 | | Comparative Example 1 | |
| --- | --- | --- | --- | --- |
| | Tape Width (mm) | Gap Width (mm) | Tape Width (mm) | Gap Width (mm) |
| 1$^{st}$ layer | 54.0*1 | 0.64 | 54.0*1 | 0.64 |
| 2$^{nd}$ layer | | 0.83 | | 0.83 |
| 3$^{rd}$ layer | | 1.02 | | 1.02 |
| 4$^{th}$ layer | | 1.21 | | 1.21 |
| 5$^{th}$ layer | | 1.39 | | 1.39 |
| 6$^{th}$ layer | | 1.57 | | 1.57 |
| 7$^{th}$ layer | 55.0*2 | 0.74 | | 1.74 |
| 8$^{th}$ layer | | 0.91 | | 1.91 |
| 9$^{th}$ layer | | 1.08 | | 2.08 |
| 10$^{th}$ layer | | 1.25 | | 2.25 |
| 11$^{th}$ layer | | 1.41 | | 2.41 |
| 12$^{th}$ layer | | 1.57 | | 2.57 |
| 13$^{th}$ layer | 56.0*3 | 0.73 | | 2.73 |
| 14$^{th}$ layer | | 0.88 | | 2.88 |
| 15$^{th}$ layer | | 1.03 | | 3.03 |
| 16$^{th}$ layer | | 1.18 | | 3.18 |
| 17$^{th}$ layer | | 1.33 | | 3.33 |
| 18$^{th}$ layer | | 1.47 | | 3.47 |
| 19$^{th}$ layer | | 1.61 | | 3.61 |
| 20$^{th}$ layer | | 1.75 | | 3.75 |

*1 Width of adhesive portion, 47.5 mm; total width of non-adhesive portions, 6.5 mm
*2 Width of adhesive portion, 48.5 mm; total width of non-adhesive portions, 6.5 mm
*3 Width of adhesive portion, 49.5 mm; total width of non-adhesive portions, 6.5 mm As is apparent from the results in Table 1, the gap width variation is confined within a narrow range from the first to last layers in the adhesive roll cleaner of Example 1, whereas the gap width in the comparative roll cleaner continuously increases from the first (the innermost) to last (the outermost) layers. While not shown in Table 1, it was confirmed that no tearing of the adhesive tapes occurred in the roll cleaner of Example 1 when they were peeled off with a number of hairs clinging therearound in the circumferential direction.

As described above, the present invention economically provides an adhesive roll cleaner having helically wound adhesive tapes, the adhesive tape being prevented from lifting during winding or storage of the cleaner or from being peeled unintentionally during use of the cleaner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:
1. An adhesive roll cleaner comprising:
  a core tube including a plurality of adhesive tapes,
  each of the adhesive tapes including an adhesive applied to one side thereof to form an adhesive portion,
  each of the adhesive tapes being helically wound around the core tube in a layered configuration with the adhesive portion out,
  each of the adhesive tapes being wound with a gap of prescribed width between every adjacent turn, and
  the adhesive tapes having different widths being arranged in groups such that adjacent tapes in a group that is lowest have a smallest width, adjacent adhesive tapes in a group that is uppermost have a largest width, and a width of adjacent adhesive tapes in an intermediate group, which is positioned between the uppermost and lowest adhesive tapes is between the largest width and smallest width, wherein a width of the gap between adjacent turns increases from an innermost layer with respect to the core tube, to an outermost layer, with respect to the core tube, such that a gap between adjacent turns in the innermost layer is smaller than a gap between adjacent turns in the outermost layer.

2. An adhesive roll cleaner comprising:

a core tube including a plurality of adhesive tapes, each of the adhesive tapes including an adhesive applied to one side thereof to form an adhesive portion, each of the adhesive tapes being helically wound around the core tube in a layered configuration with the adhesive portion out, each of the adhesive tapes being wound with a gap of prescribed width between every adjacent turn, and the adhesive tapes having different widths, an adhesive tape which is located at an uppermost layer having a larger width than that of an adhesive tape which is located at a lowermost layer, wherein a width of gap between each turn increases from an innermost layer with respect to the core tube, to an outermost layer, with respect to the core tube, a first plurality of adjacent layers are disposed in a first group and have a first width, and a second plurality of adjacent layers are disposed in a second group and have a second width that is larger than the first width, and the first group is disposed closer to the core tube than is the second group.

3. The adhesive roll cleaner according to claim 2, wherein the adhesive tapes each have a non-adhesive portion with no adhesive applied on both longitudinal sides of the adhesive tape.

4. The adhesive roll cleaner according to claim 2, wherein the gap between every adjacent turns has a width of 0.1 to 4.0 mm.

5. The adhesive roll cleaner according to claim 2, wherein the adhesive tapes each have a tear strength of 500 mN or greater as measured with an Elmendorf tear tester in accordance with JIS P8116.

6. The adhesive roll cleaner according to claim 2, wherein positions of the gaps are different between adjacent layers in the thickness direction.

7. The adhesive roll cleaner according to claim 2, wherein each adhesive tape includes a mark indicative of a peel position.

8. The adhesive roll cleaner according to claim 7, wherein the mark is on a longitudinal side area not including adhesive.

9. The adhesive roll cleaner according to claim 2, wherein the angle of winding increases from the lower layer to the upper layer.

10. An adhesive roll cleaner comprising:

a core tube;

a plurality of adhesive tapes, including first and second adhesive tapes, wound around the core tube, each of the adhesive tapes including an adhesive applied to one side thereof to form an adhesive portion, each of the adhesive tapes being helically wound around the core tube at an angle of winding and in a layered configuration with the adhesive portion facing outward with respect to the core tube, and the adhesive tapes being disposed in at least first and second groups, the tapes disposed within the first group having a first width, and the tapes disposed within the second group having a second width larger than the first width, the first adhesive tape, which is located at an outer layer with respect to the core tube, having a larger width than a width of the second adhesive tape, which is located at an inner layer closer to the core tube than is the outer layer, wherein a first gap is disposed between an end of the first adhesive tape and an end of a third adhesive tape, which third adhesive tape is a next adhesive tape wound around the core tube after the first adhesive tape, a second gap is disposed between an end of the second adhesive tape and an end of a fourth adhesive tape, which fourth adhesive tape is a next adhesive tape wound around the core tube after the second adhesive tape, a width of the first gap is greater than a width of the second gap, and the angle of winding increases from the lower layer to the upper layer.

* * * * *